United States Patent [19]

Reed

[11] Patent Number: 4,778,001
[45] Date of Patent: Oct. 18, 1988

[54] HEAT EXCHANGE METHOD AND APPARATUS

[75] Inventor: Colin M. Reed, Manchester, England

[73] Assignee: Shirley Institute, Manchester, England

[21] Appl. No.: 926,670

[22] Filed: Nov. 4, 1986

[30] Foreign Application Priority Data

Nov. 9, 1985 [GB] United Kingdom ............... 8527685

[51] Int. Cl.$^4$ ............................................. B01D 3/00
[52] U.S. Cl. ................... 165/104.31; 165/111; 202/234; 203/10; 203/26; 203/24; 203/100
[58] Field of Search .................... 165/111, 104.31; 203/26, 24, 10, 100; 202/234

[56] References Cited

U.S. PATENT DOCUMENTS

| | | | |
|---|---|---|---|
| 2,561,471 | 7/1951 | Hatfield | 165/111 |
| 2,976,224 | 3/1961 | Gilliland | 203/10 |
| 3,032,482 | 5/1962 | Shoemaker | 203/10 |
| 3,181,600 | 5/1965 | Woodward et al. | 203/100 |
| 3,219,554 | 11/1965 | Woodward | 203/100 |
| 3,294,649 | 12/1966 | Powell, Jr. | 203/26 |
| 3,394,055 | 7/1968 | Ludwig | 203/24 |
| 4,315,402 | 2/1982 | Sadhubhan | 203/100 |

Primary Examiner—Albert W. Davis, Jr.
Attorney, Agent, or Firm—Charles J. Brown

[57] ABSTRACT

There is disclosed a method and apparatus for exchanging heat between a first fluid and a second fluid immiscible with said first fluid comprising the step of presenting one of said fluids in finely divided form for direct contact with the others. One fluid may be a molten metal which is sprayed or bubbled through the other.

6 Claims, 1 Drawing Sheet

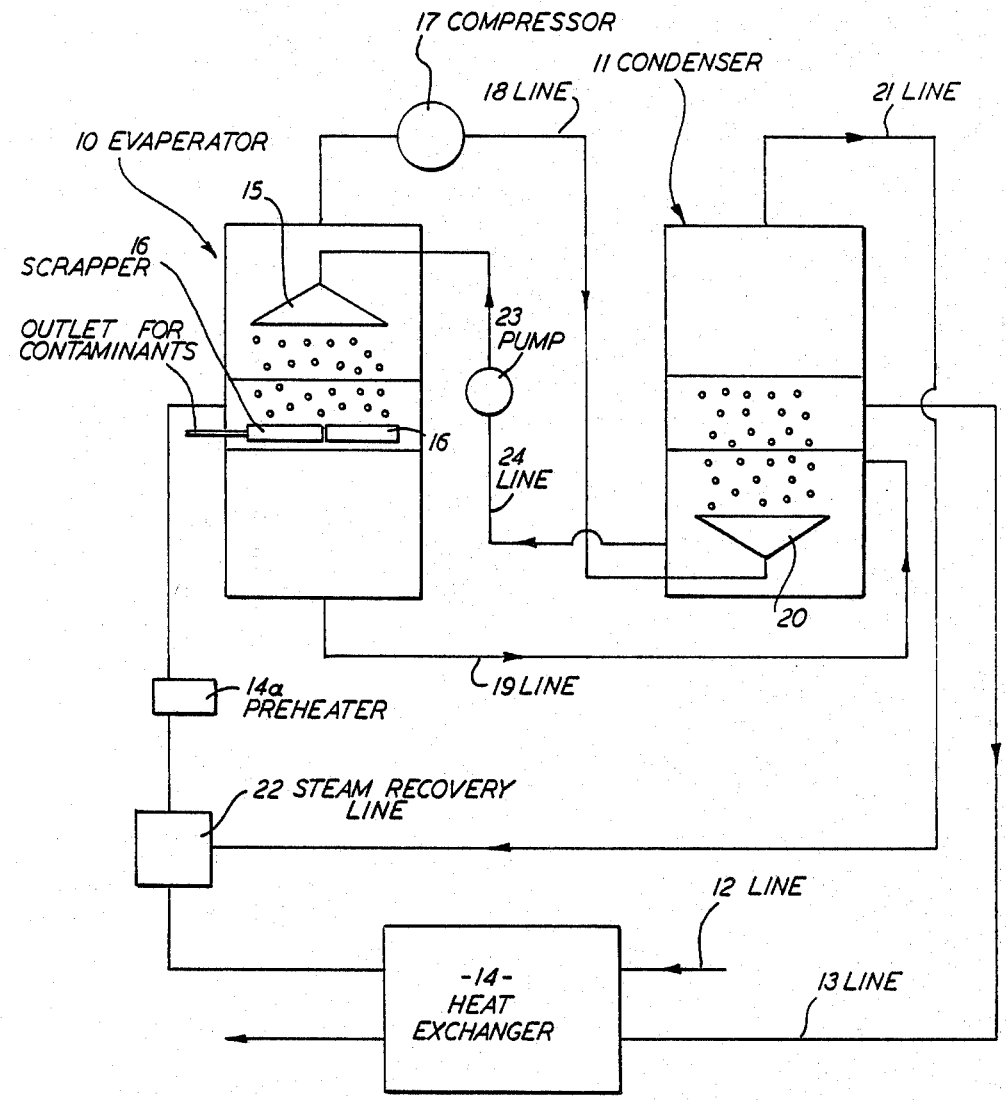

HEAT EXCHANGE METHOD AND APPARATUS

This invention concerns a method of heat exchange, particularly, though by no means exclusively, adapted for use in effluent treatment, and apparatus for effecting same.

Clearly for the transfer of a given quantity of heat in unit time the area of the heat exchange surface and the temperature differential may vary inversely.

The present invention is based upon an appreciation of the possibility of providing a heat exchange surface resistant to fouling and greatly larger than normally attainable with conventional heat exchange technology.

According to one aspect of the present invention there is provided a method of exchanging heat between a first fluid and a second fluid immiscible with said first fluid comprising the step of presenting one of said fluids in finely divided form for direct contact with the other.

The one fluid be comprised by molten metal. The molten metal may be sprayed into, bubbled through or otherwise mixed with the other, or the other may be sprayed into bubbled through or otherwise mixed with the metal.

There has long been concern about water use and effluent disposal in the textile finishing industry. This arises from the costs of each item and increasingly stringent discharge conditions such that many plants already have to undertake a degree of effluent treatment. The treated effluent is not always suitable for reuse even after expensive tertiary chemical treatment, and its discharge is usually accompanied by significant heat loss.

At present, for a typical finishing works, water costs between 5,000 and 39,000 per year, depending on source; effluent disposal costs between 23,000 and 31,000 per year, and the heat in the effluent is equivalent to about 70,000 per year in fuel oil costs. Therefore the total cost of water and its disposal lies between 98,000 and 140,000 per year. For the finishing sector in the United Kingdom as a whole this becomes about 20 million per year.

Effluent treatment by distillation using a mechanical vapour recompression system does not seem to have been practised presumably on account of the need for low temperature differentials and consequently inconveniently large heat exchange surfaces in order to attain acceptably low process costs. Fouling of the heat exchange surfaces would be another problem.

It is believed that the heat exchange method proposed by the present invention will provide a solution to this problem enabling cost effective effluent treatment enabling repeated use of process water in the textile finishing and other industries.

The invention will be further apparent from the following description with reference to the single figure of the accompanying drawing which shows, by way of example only, and in diagrammatic form one form of effluent treatment plant utilising the heat exchange method proposed by the invention.

Referring now to the drawing, it will be seen that the plant comprises an evaporator vessel 10 and condenser 11.

Effluent to be treated enters the plant through line 12 and is heated by heat exchange with the outflowing treated effluent in line 13 by passage through a heat exchanger 14 of conventional kind and by a preheater 14a.

The heated effluent enters the evaporater 10 and is vapourised by direct contact heat exchange with molten metal which is sprayed into the evaporater 10 in the form of fine droplets presenting a large surface area from a spray-head 15. A preferred metal is Wood's metal, an alloy of bismuth, cadmium, tin and lead which is relatively inert and liquid at temperatures above 71° C. The metal sinks through the effluent and collects in the bottom of the evaporater 10 leaving contaminants floating thereon for harvesting by a mechanical scraper arrangement generally indicated at 16.

The vapour generated in the evaporater 10 is compressed by vapour compressor 17 and passed through line 18 to the condenser 11.

The cooled but still liquid metal flows by gravity through line 19 into the base of condenser 11, there to be reheated by heat exchange with the compressed vapour which is bubbled therethrough from a diffuser head 20. The condensed vapour forming water of high purity is led away through line 13 via heat exchanger 14.

Uncondensed vapour or flash steam is collected in line 21 from the top of condenser 11 condensed in the inflowing effluent and returned to the evaporater 10 by means of a flash steam recovery unit 22 such as a sparge pipe.

Molten metal is pumped by pump 23 from the condenser 11 through line 24 to the spray-head 15.

The effluent might be chemically treated if necessary to prevent the metal from being dissolved.

It will be appreciated that it is not intended to limit the invention to the above example only, many variations, such as might readily occur to one skilled in the art, being possible, without departing from the scope thereof.

Other metal alloys may be used such as Cerrotru alloy which whilst having a higher melting point does not include highly toxic heavy metals.

The compressor drive is advantageously a gas engine with heat recovery from coolant to the effluent preheater.

Stirrers and or baffles may be provided in the evaporator and condenser to increase contact times between the two fluids.

I claim:

1. A method of exchanging heat between a first fluid and a molten metal immiscible with said first fluid which comprises
   (a) dispersing said molten metal through the first fluid in the liquid state to evaporate the first fluid and cool the molten metal,
   (b) transferring the cool but still molten metal to a condenser,
   (c) compressing the evaporated first fluid,
   (d) diffusing the compressed evaporated first fluid through the molten metal in the condenser to partially condense the first fluid and reheat the molten metal,
   (e) transferring the condensed first fluid to an outlet and the uncondensed first fluid to the evaporator, and
   (f) pumping the reheated molten metal from the condenser to the evaporator.

2. A method according to claim 1 wherein the first fluid is effluent requiring treatment.

3. A method according to claim 1 wherein the molten metal is Woods metal.

4. Apparatus for exchanging heat between a first fluid and a molten metal immiscible with said first fluid comprising
 (a) an evaporator into which said first fluid is received as a liquid,
 (b) means for dispersing said molten metal through the liquid first fluid in the evaporator to evaporate the first fluid and cool the molten metal,
 (c) a condenser into which the cool but still molten metal is introduced from the evaporator,
 (d) a compressor for compressing the evaporated first fluid from the evaporator,
 (e) means for diffusing the compressed evaporated first fluid through the molten metal in the condenser to partially condense the first fluid and reheat the molten metal,
 (f) means for transferring the condensed first fluid to an outlet and the uncondensed first fluid to the evaporator, and
 (g) means for pumping the reheated molten metal from the condenser to the spray head in the evaporator.

5. Apparatus according to claim 4 wherein the first fluid is effluent requiring treatment.

6. Apparatus according to claim 4 wherein the metal is Woods metal.

* * * * *